A. DAVIS.
Grooving-Machines.
No. 154,946. Patented Sept. 15, 1874.
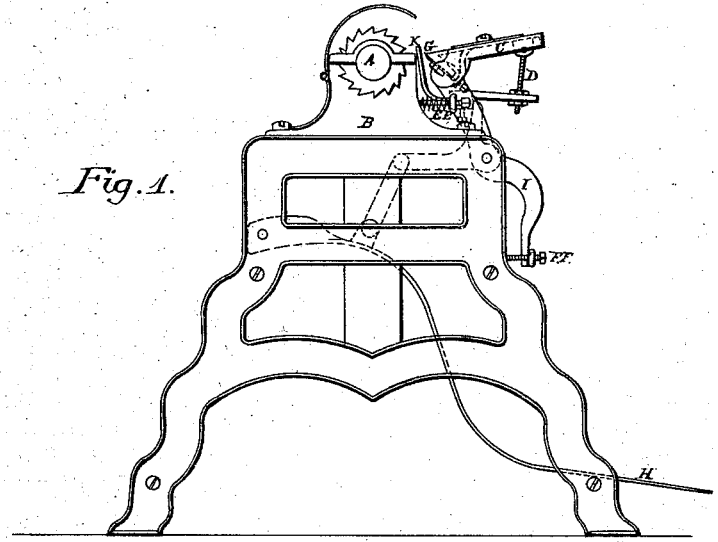
Fig. 1.
Fig. 2.
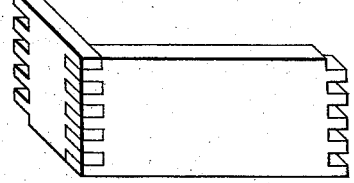
Fig. 3.
Witnesses:
Thulock G. Tilton
Matthew Miller
Inventor:
Asahel Davis

UNITED STATES PATENT OFFICE.

ASAHEL DAVIS, OF LOWELL, MASSACHUSETTS.

IMPROVEMENT IN GROOVING-MACHINES.

Specification forming part of Letters Patent No. 154,946, dated September 15, 1874; application filed April 8, 1874.

*To all whom it may concern:*

Be it known that I, ASAHEL DAVIS, of Lowell, in the county of Middlesex and State of Massachusetts, have invented certain Improvements in Grooving-Machines, of which the following is a specification:

My invention relates to the hinged or swinging table on which is placed the board for grooving, the object being to so adjust the board for the different thicknesses and different lengths of groove, as required. It also relates to the adjustable chip-breaker, in connection with the groove-cutting cylinder, the object being to prevent the wood from breaking or splitting beyond the bottom of the groove. It also relates to the adjustable stop or stops K, to gage the cut of the board, the object being to give at all times an equal and desired depth to the groove; and it also relates to the adjustable screws regulating the throw and adjustment of the table to the wear of the cutters.

Figure 1 is an end elevation of the machine embodying the several parts of my invention. Fig. 2 is an end view of the hinged or swinging table, showing the method of adjusting the chip-breaker embodied in the second part of my invention. Fig. 3 shows the style of groove and manner of putting together.

In the following description similar letters of reference represent corresponding parts in the different figures of the drawing.

A is the cutter-shaft, on which is placed the cutters, of even thickness, and separated at such distances as the thickness of the cutters require, by means of collars or washers placed between them, and supported by a suitable frame, as B. C is the hinged or swinging table, operated, by means of screw D, to give it the desired elevation. E E are adjustable screws to regulate the throw of the table C, thus allowing the table to come as near, and at the same time preventing the chip-breaker G from coming in contact with, the cutting-cylinder A. F F are adjustable screws to prevent the table from receding too far from the cutting-cylinder A, thus allowing the table to be adjusted to the wear of the cutters. G is the chip-breaker, secured to the table C, thus forming a break at the bottom of the groove, thereby preventing the board from splitting beyond the length of the groove. H is the pedal, by means of which the swing-frame I, in connection with the adjustable table C, may be operated by the foot, when required. I is the swinging frame, supporting the hinged table C.

It is obvious that the combination here shown may be somewhat changed; the cutters may be so set that two or more may be placed together, and as many collars for holding the cutters the required distance apart; but as this is only to give variety to the size of the groove, and, not necessary to the operation, I need not explain. It is also obvious that the treadle may be used or not, according to the work being done, or by the wish of the operator. I find, in practice, that for common work, where the stock is straight-grained, and no extra nicety is required, the board may be fed by hand, which will answer all purposes. By using the pedal the board can be held firmer by the operator, and cut more carefully; consequently better.

I do not claim using a series of cutters for doing this kind of work, neither do I claim a box made in this form, for I am well aware that boxes have been thus made for a series of years; but What I do claim, and wish to secure by Letters Patent, is—

The combination of the frame I, adjusting and tilting table C, chip-breaker G, stops K, and cutting-cylinder A, in the manner and for the purpose substantially as specified.

ASAHEL DAVIS.

Witnesses:
GEORGE F. RICHARDSON,
A. C. NARNUM.